(12) United States Patent
Zack et al.

(10) Patent No.: US 8,121,542 B2
(45) Date of Patent: Feb. 21, 2012

(54) VIRTUAL CONNECTOR BASED ON CONTACTLESS LINK

(75) Inventors: Rafi Zack, Kiryat-Ono (IL); Doron Rainish, Ramat-Gan (IL)

(73) Assignee: Rafi Zack, Kiryat-Ono (IL)

( * ) Notice: Subject to any disclaimer, the term of this patent is extended or adjusted under 35 U.S.C. 154(b) by 518 days.

(21) Appl. No.: 12/251,015

(22) Filed: Oct. 14, 2008

(65) Prior Publication Data

US 2009/0098826 A1   Apr. 16, 2009

Related U.S. Application Data

(60) Provisional application No. 60/999,012, filed on Oct. 16, 2007.

(51) Int. Cl.
*H04B 5/00* (2006.01)
*H04B 7/00* (2006.01)

(52) U.S. Cl. ..................... 455/41.1; 455/41.2

(58) Field of Classification Search .............. 455/41.1, 455/41.2, 41.3, 553.1, 246.1; 370/535, 536, 370/538, 540, 542
See application file for complete search history.

(56) References Cited

U.S. PATENT DOCUMENTS

| | | | |
|---|---|---|---|
| 7,536,152 B2 * | 5/2009 | Inano et al. | 455/41.2 |
| 7,699,228 B2 * | 4/2010 | Wakasa et al. | 235/472.01 |
| 7,975,921 B2 * | 7/2011 | Mani et al. | 235/441 |
| 8,035,488 B2 * | 10/2011 | Shiotsu et al. | 340/10.33 |

* cited by examiner

*Primary Examiner* — Eugene Yun

(57) ABSTRACT

The today's mobile handheld and portable devices become slim and thin while need to communicate with other devices and accessories that are attached or at very short range. The interface (contact based physical connector) becomes a real challenge and unreliable to the consumer that needs to attached and detach its device several times a day.

It is an object of the present invention to provide system and method of replacing a contact based physical interface (connector) with very short range wireless (contactless) interface. This technique is called "contactless virtual connector" or CVC.

The method of the present invention is based on a transmission of a very low power and wideband RF signal. The new innovating mechanism replaces the traditional physical connector with new radiated signal technique that consumes very low power and may be cost competitive with the today's physical connectors.

The innovated contactless technology may be used for small flexi-cable replacement in the handheld devices as flip or slider based handheld devices.

Although the contactless technique is a wireless based solution, yet, the link may be well secured at the Physical layer when the near-field technique is used.

25 Claims, 3 Drawing Sheets

VIRTUAL CONNECTOR BASED ON CONTACTLESS LINK

Priority Application No. US60/999,012 filing date: Oct. 16, 2007.

BRIEF DESCRIPTION OF THE DRAWINGS

The present invention will be understood and appreciated more fully from the following detailed description taken in conjunction with the appended drawing in which.

BACKGROUND OF THE INVENTION

Virtual Connector is defined as a very short range less then 1 meter, point to point wireless link (contactless link). This link has similar characteristics as a regular connector:

Very Low latency

High reliability link. I.e. very low Bit Error Rate

High quality preservation for the analog signals

The innovated technology is low power design for very high data rate virtual connector. It enables a replacement of exiting high speed contact-based physical connector with such a wireless technology and may use any unlicensed broadband spectrum. Since the distance is almost zero, the required transmission power is low.

The contactless technology may be used for small flexi-cable replacement in the handheld devices as flip or slider based handheld devices.

Figure 1:
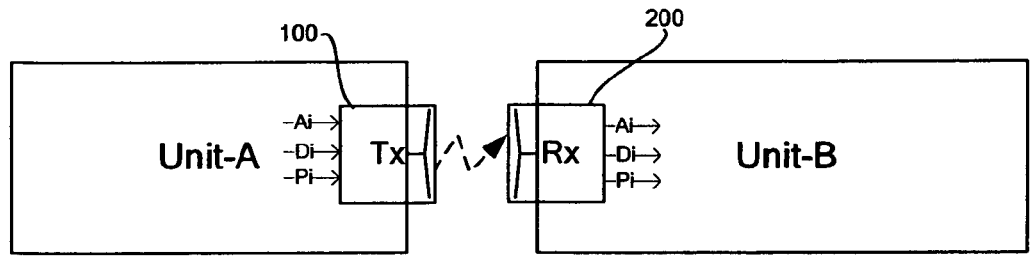
FIG. 1 is a schematic illustration of conceptual contactless virtual connector (CVC) system

The innovated virtual connector may carry all type of signals that are transferred with regular connector (see FIG. 1) as digital signal (Di), analog signal (Ai) and Power supply (Pi). The innovative technique enables a transfer of data at speeds as high as several Gbits/sec (Giga Bits per second) and analog signals up to several GHz, from the contactless transmitter (FIG. 1, 100) to contactless receiver (FIG. 1, 200)

DETAILED DESCRIPTION OF THE INVENTION

The Contactless Virtual Connector (CVC) may replace any existing connector or small flexi-cables that transfer various type of information signals either digital, analog, data, control or clock from one side to the other side.

The CVC optimizes the link throughput and its latency by pre-defining the various types of signals and handles these signals in the optimal way.

The transmitter (FIG. 2) serializes all the input signals into one stream (FIG. 2, 141) which is then modulated and transmitted wirelessly over the near field. The CVC is pre-configured according to the connector signals type (analog/digital) and required characteristics as bit rate (digital) or sampling rate (analog), latency, synchronous/asynchronous, sampling clock etc.

Figure 2:
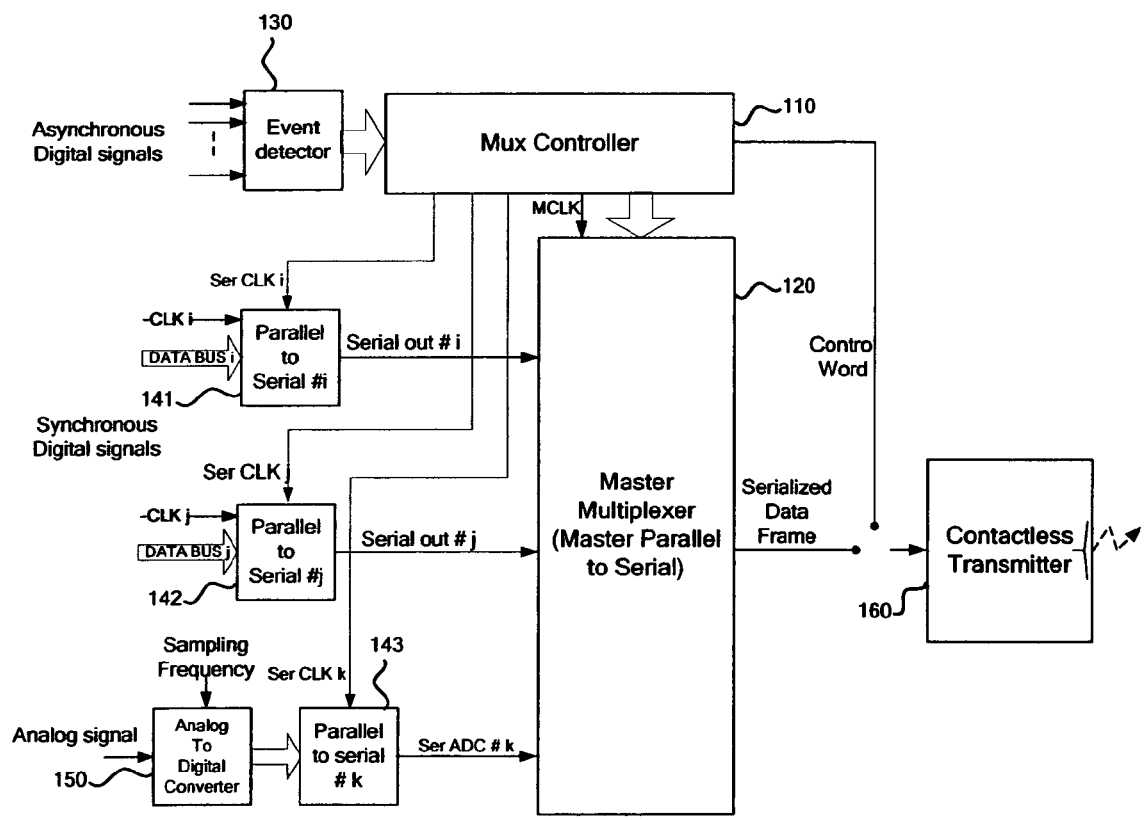
FIG. 2 is a schematic illustration of CVC transmitter side

The CVC transmitter configuration is done at the CVC Multiplexer controller (FIG. 2, 110). The Multiplexer controller configures the CVC transmitter Master multiplexer (FIG. 2, 120) and the other units according to the initialization setting. The Multiplexer controller can also configure the Master multiplexer to support dynamic events per instantaneous cycle (FIG. 2, 130).

The CVC static configuration is done according to the following criteria (see FIG. 2):

1. Synchronous digital data bus—This signals set will be mapped and sampled with its original data clock. The parallel sampled data bus will be serialized with the Parallel to Serial (P2S) unit that is associated with a proper clock (FIG. 2, 141-143).
2. Asynchronous digital signals—these signals are mapped to an event detector (FIG. 2, 130). The event detector recognizes the signaling which occurred at the asynchronous line and indicates that event to the multiplexer controller which prepares the control word to be sent to the CVC receiver.
3. Analog signal—the analog signal is sampled with the required sampling rate (FIG. 2, 150) to ensure preservation of the signal quality at the CVC receiver output. The sampled signal, presented by a digital word, is serialized by the P2S unit (FIG. 2, 143).

All the serialized digital streams are multiplexed and concatenated by the master multiplexer and is transmitted as one serialized data frame through the Contactless transmitter (FIG. 2, 160). The data frame is transmitted following the control word that is generated by the multiplexer controller and indicate the exact data frame mapping and required timing to be reconstructed at the CVC receiver.

The CVC is operated in a CVC Frame Period (CFP) mode while at each CFP the control word sub-frame is generated and is followed by the serialized data sub-frame which is sampled at that instantaneous time period.

When the input channel at the CVC transmitter is configured for analog signal, the analog channel is directed to high performance Analog to Digital converter (FIG. 2, 150). The digital word is then entered to the digital multiplexer.

At the CVC receiver side the digital word is reconverted back to analog domain by using the Digital to analog converter.

The digital signals may be characterized by synchronous, asynchronous, high rate low rate etc.

The CVC can be configured for each channel to the optimized operation mode.

1. Synchronous digital signal—the synchronous digital signal will be sampled at the proper reference clock and will be sent to the CVC receiver.
2. Asynchronous digital signal—this signal will be sampled whenever an event detector could recognize any signal change. This will be done by an edge sensitive detector. Once the detector senses a signal change, the relevant input channel is sampled by the reference clock and the multiplexer activates that channel. The frame control word will indicate that the upcoming frame includes the sampled asynchronous channel
3. Power supply—the power can be wirelessly transmitted using one of the available methods The multiplexer (MUX) controller decides the instantaneous multiplexer inputs configuration to be serialized to the Contactless transmitter path. The decision is based on the static configuration and dynamic event detector sensing.

Figure 3:
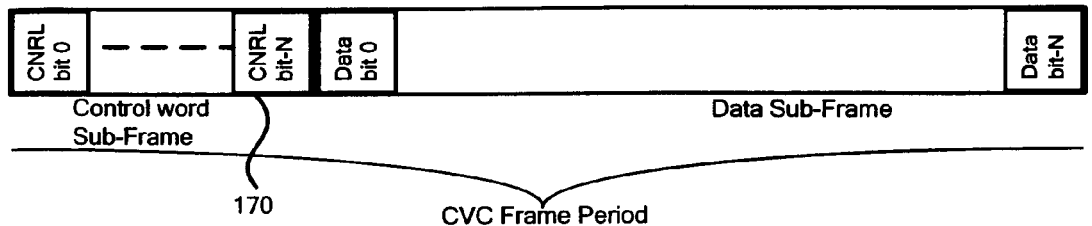
FIG. 3 is a schematic illustration of CVC protocol frame structure

The multiplexer controller generates a control word (FIG. 3, 170) that is sent to the CVC receive to enable the instantaneous signals remapping. The data to frame will be sent following the control word.

Figure 4:
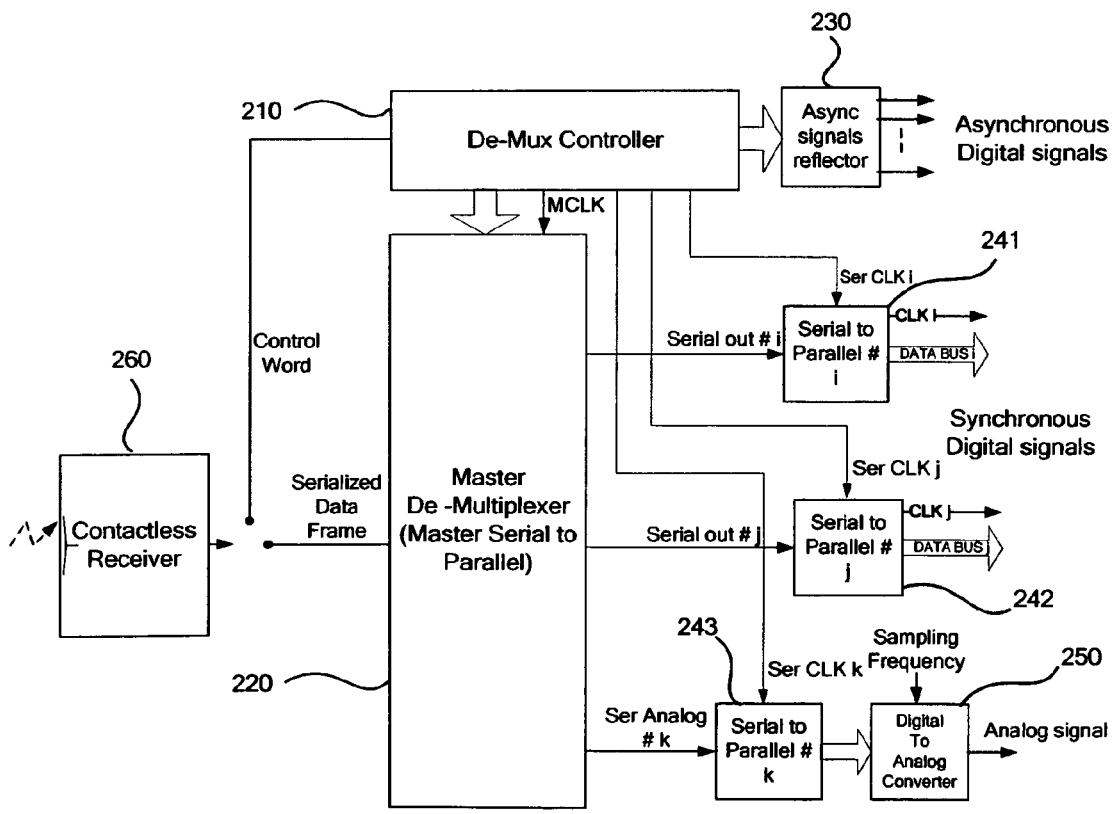
FIG. 4 is a schematic illustration of CVC receiver side

The CVC Receiver receives the packet (control word, data frame) through the contactless receiver (FIG. 4, 260). The control word is mapped to the De-Multiplexer controller (FIG. 4, 210) which reconstructs the asynchronous digital signals. The asynchronous signals are timing aligned by the Async Signals Reflector (FIG. 4, 230). The other synchronous data are mapped through the master multiplexer (FIG. 4, 220) and the dedicated clock Serial to Parallel units (FIG. 4, 241-243).

The Asynchronous Signals Reflector (FIG. 4, 230) ensures that all the asynchronous signals are reflected properly to the CVC receiver output. I.e. takes care for the correct signaling sequence during one frame time period. This can be done with the information that has been collected by the event detector at the CVC transmitter (FIG. 4, 130).

PREFERRED EMBODIMENT

Figure 5:
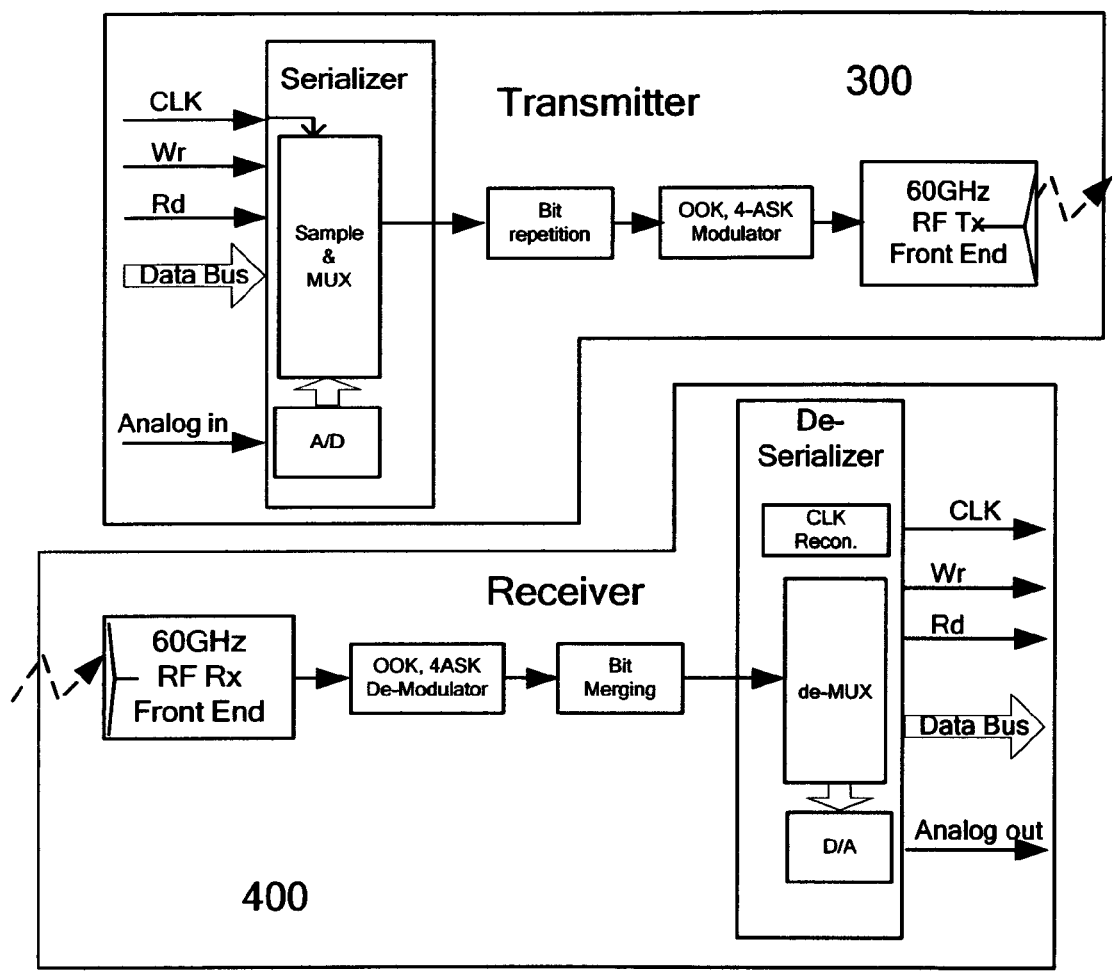
FIG. 5 is a schematic illustration of CVC preferred embodiment

The innovated contactless system provides an Extremely High Data Rate (EHDR) contactless connector that drives digital and/or analog signals from end to end.
The architecture is optimized for low power and low cost implementation.
The innovated system uses the unlicensed band between 57 GHz-66 GHz. The 60 GHz RF front end is designed to support high efficiency and low power solution, while performance is optimized for the very short ranges. The modulation is based on non-coherent architectures as On/Off Keying (OOK), 4-Levels Amplitude Shift Keying (4-ASK), Differentially Binary Shift Keying (DBPSK) and Differentially Quadrature Shift Keying (DQPSK) that save a simple receiver implementation. FIG. 5 presents the general structure of the contactless transmitter (FIG. 5, 300) and contactless receiver (FIG. 5, 400).

The transmitter (FIG. 5, 300) of the contactless based virtual connector consists of multiplexer, modulator, RF front-end and antenna. The multiplexer samples the input digital signal. Analog signal is, first, converted to digital word and then multiplexed with the other digital signals. The multiplexer streams the concatenated bits into OOK, 4ASK, DBPASK or DQPSK modulator. The modulator sends the symbols to the RF front end which up converts the signals to the 60 GHz unlicensed band. The RF signal is transmitted to the receiver side through a near-field or far-field based antenna.

The CVC receiver (FIG. 5, 400) consists of De-multiplexer, De-modulator, RF front-end and antenna. The 60 GHz RF signal is received by the near-field or far-field based antenna. It is amplified, filtered and down converted to the OOK, 4ASK, DBPSK or DQPSK demodulator. The demodulated soft and repeated bits are marged and are streamed in to the demultiplexer. The demultiplexer reproduces the original digital signals as was presented at the transmitter connector input. Digital bits to be represented as analog signals are sent through a digital-to-analog converter.

BRIEF SUMMARY OF THE INVENTION

The object of the present invention is to provide system and method for a replacement of contact based connector or in-device flexi-cable with contactless (wireless based) connector which may be called "contactless virtual connector". This method uses a low dynamic range wireless transceiver, very small module with an integrated antenna that leads to low power and small size solution that may be easily integrated in handheld devices.

What is claimed is:

1. A very short range contactless communication system for replacing a contact-based connector or flexi-cable between a first and a second electronic units comprising:
a transmitter, wherein said transmitter comprising:
at least one input, receiving at least one electronic input signal from the first electronic unit;
a multiplexer, receiving digital data indicative of signals in said at least one input, and producing a serialized digital data stream indicative of signals in said at least one input;
a transmitter MUX controller controlling the operation of said multiplexer;
a high frequency contactless RF transmitter receiving said serialized digital data stream and producing modulated high frequency RF signal; and
a transmitter antenna transmitting said modulated high frequency RF signal over a distance of less than 1 meter to a receiver;
and
a receiver wherein said receiver comprising:
a receiver antenna receiving said modulated high frequency RF signal;
a high frequency contactless RF receiver, receiving and detecting said modulated high frequency RF from said receiver antenna and generating a serial digital data stream in response to said RF signal;
a de-multiplexer, receiving said generated serial digital data stream and generating digital output data;
a receiver De-MUX controller controlling the operation of said de-multiplexer; and
at least one output for outputting at least one electronic output signal to the second electronic unit, wherein said at least one electronic output signal is substantially identical to said least one electronic input signal.

2. The communication system of claim 1 wherein:
said transmitter comprises a plurality of inputs;
said multiplexer is configured for multiplexing signals from said plurality of inputs to a single serial data stream; and
said de-multiplexer is capable of de-multiplexing said generated serial digital data stream detected by said contactless RF receiver to the corresponding outputs.

3. The communication system of claim 1 wherein said multiplexer is configured for multiplexing a plurality of serial digital data streams into a single serialized digital data stream.

4. The communication system of claim 1 wherein:
said transmitter comprises:
at least one analog input receiving analog input signal from said first electronic unit; and
an analog to digital converter converting said analog input signal to converted digital data and transmitting said converted digital data to said multiplexer;
and
said receiver comprises:
a digital to analog converter, receiving digital signals from said de-multiplexer and generating analog signal; and
an analog output, outputting said analog output to said second electronic unit.

5. The communication system of claim 4 wherein:
said digital to analog converter converts said analog input signal to parallel digital data;
said transmitter further comprises a parallel to serial converter converting said parallel digital data to serial data stream and transferring said serial data stream to said multiplexer;
said receiver further comprises a serial to parallel converter converting serial data from said de-multiplexer to parallel data; and
said digital to analog converter receives parallel data from said serial to parallel converter and convert said parallel data to analog signals.

6. The communication system of claim 1 wherein:
at least one data input is a clock input;
said transmitter is configured to transmit clock data to the receiver over the RF signal;
said receiver is configured to recover clock data from the received RF signal; and
at least one of said outputs is a clock output.

7. The communication system of claim 6 wherein:
at least one data input is a parallel synchronized digital data input;
said transmitter further comprises a parallel to serial converter converting said parallel synchronized digital data to serial data stream and transferring said serial data stream to said multiplexer;
said receiver further comprises a serial to parallel converter converting serial data from said de-multiplexer to parallel synchronized digital data.

8. The communication system of claim 1 wherein:
said transmitter MUX controller generates control word, and causes said transmitter to arrange the transmitted data in frames, each including a control word sub-frame bits and data sub-frame bits; and
said receiver further comprises a receiver De-MUX controller capable of detecting said control word sub-frame bits in serial digital data stream received from said contactless RF receiver, and controls said de-multiplexer to separate data sub-frame bits according to said control word.

9. The communication system of claim 8 wherein:
said transmitter comprises an asynchronous digital input;
said transmitter further comprises an event detector configured to detect signal change in said asynchronous digital input and report such event to said transmitter MUX controller;
said transmitter MUX controller is configured to embed data indicative of said detect signal change in said asynchronous digital input in the transmitted RF signal;
said receiver De-MUX controller is capable of generating data indicative of said asynchronous digital input in response to said data stream received from said contactless RF receiver; and
said receiver further comprises a asynchronous reflector, receiving data indicative of said asynchronous digital input from said De-MUX and generating asynchronous digital output signals.

10. The communication system of claim 1 wherein said high frequency RF signal is operated at unlicensed frequency band.

11. The communication system of claim 10 wherein said unlicensed frequency band is between 57 GHz and 66 GHz.

12. The communication system of claim 1 wherein said transmitting antenna and said receiving antennas are near-field antennas.

13. The communication system of claim 12 therein the distance between said transmitting antenna and said receiving antennas is almost zero.

14. The communication system of claim 1 therein said transmitting antenna and said receiving antennas are along a line of sight.

15. The communication system of claim 1 wherein said system is used for replacing a contact-based connector.

16. The communication system of claim 1 wherein said system is used flexi-cable replacement in handheld flip device or handheld slider device.

17. The communication system of claim 1 and further comprising power transmission.

18. The communication system of claim 1 wherein said contactless RF transmitter comprises a modulator and a baseband to RF up-converter.

19. The communication system of claim 1 wherein said contactless RF transmitter comprises a modulator selected from a group consisting of: binary based modulator with On-Off Keying (OOK), 4-Levels Amplitude Shift Keying (4-ASK) modulator, and Differential Phase Shift Keying (D-PSK) modulator.

20. The communication system of claim 1 wherein said contactless RF transmitter uses bit repetition.

21. The communication system of claim 1 wherein said contactless RF receiver uses technologies selected from the group consisting of: RF down-conversion, non-coherent demodulator, and majority based bit detection.

22. The communication system of claim 1 wherein said transmitter MUX controller is used to generate the order of multiplexing the inputs signals of the multiplexer and to generate control word that describes the multiplexing order at the data frame which is the multiplexer output.

23. The communication system of claim 22 wherein said control word is transmitted to the receiver in order to configure said de-multiplexer and reconstruct the data frame at the receiver.

24. The communication system of claim 22 wherein said MUX controller is pre-configured according to the connector signals and required characteristics to determine the instantaneous multiplexer inputs configuration to be serialized to the contactless transmitter path, wherein said required characteristics are selected from a group consisting of: bit rate; latency; synchronous/asynchronous; and sampling clock.

25. The communication system of claim 22 wherein said MUX controller is operated in a pre-defined frame period mode, wherein at each of said frame period said control word sub-frame is generated and is followed by the serialized data sub-frame which is sampled during that instantaneous time period.

* * * * *